UNITED STATES PATENT OFFICE.

ADALBERT VON HOFMANN, OF AUGSBURG, BAVARIA, GERMANY.

PREPARING TABLETS OF COFFEE.

SPECIFICATION forming part of Letters Patent No. 256,082, dated April 4, 1882.

Application filed December 31, 1880. (No specimens.) Patented in Germany September 28, 1880, in Italy December 15, 1880, in England January 20, 1881, in France February 9, 1881, in Belgium February 14, 1881, in Spain July 14, 1881, in Austria September 14, 1881, in Portugal October 19, 1881, and in Denmark December 14, 1881.

*To all whom it may concern:*

Be it known that I, ADALBERT VON HOFMANN, resident at Augsburg, Kingdom of Bavaria, Germany, have invented a new Method of Compressing and Preserving Ground Coffee, of which the following is a specification.

My invention consists in a special method of treating ground coffee and of compressing the same into tablets or blocks, so that it will preserve its full flavor and other original qualities for a considerable length of time.

The raw coffee is roasted in closed cylinders, and after having been allowed to cool to a certain degree, but while yet warm, it is mixed uniformly with an oil or fat which is perfectly inodorous, tasteless, and free from acid—such as cocoa-butter, almond-oil, very pure olive-oil, spermaceti, &c.—about six ounces of such oil or fat being used for every one hundred pounds of coffee. The coffee having been ground, monocarbonate or bicarbonate of soda or of potassa, or any other equivalent alkaline carbonate, is added to the same, in the proportion of about one pound to one hundred pounds of coffee. By the mixture with one or more of such salts the powder is prevented from becoming sour. If it should be desired, sugar as well as any surrogate of coffee may finally be added. The coffee-powder thus prepared is hereupon exposed in measured quantities to the action of a suitable compressing apparatus, by which its particles will be caused to adhere together and to form blocks or tablets of the desired form and size. The pressure to be applied is by preference about eight thousand pounds to the square inch. In consequence of this compression the oil or fat added to the coffee will form on the surface of the blocks or tablets a skin or covering which is almost impervious to air, and which on this account insures the preservation of the coffee and prevents the volatilization of the aromatic principle of the same.

I am aware that it has heretofore been proposed to add fat to ground coffee and then to form the coffee into tablets by means of molds, as has been described in the English Patent specification No. 984, A. D. 1771, and this admixture of fat without compression of the coffee by means of a machine I therefore do not claim, nor do I claim the mixing of bicarbonate of soda with the coffee independently of the fat and the compressing process, as shown in the specification of the United States Patent No. 214,011, the said salt having also been used previously for the better extraction of the coffee; but

I claim as my invention—

The method of preserving ground coffee by mixing the roasted coffee with a fat or oil which is inodorous, tasteless, and free from acid; moreover, by adding to the coffee monocarbonate or bicarbonate of soda or of potassa, or any other equivalent alkaline carbonate, and finally by compressing the so prepared coffee-powder into blocks or tablets by means of a suitable press, substantially as and for the purpose described.

In testimony whereof I have signed my name to this specification in the presence of two subscribing witnesses.

ADALBERT VON HOFMANN.

Witnesses:
 A. RIEDINGER,
 ROBERT FURST.